United States Patent Office 3,479,329
Patented Nov. 18, 1969

3,479,329
POLYMERIZATION OF BI-SECONDARY MONO-OLEFINS
Yves Chauvin, Orsay, and Gilles Lefebvre, Rueil-Malmaison, France, assignors to Institut Francaise du Petrole, des Carburants et Lubrifiants, Rueil-Malmaison, France
Filed Nov. 19, 1964, Ser. No. 412,366
Claims priority, application France, Nov. 21, 1963, 954,608
Int. Cl. C08f 15/04, 3/12
U.S. Cl. 260—88.2     38 Claims

ABSTRACT OF THE DISCLOSURE

Polymerization of bi-secondary mono-olefins such as butene-2, pentene-2 and 4-methyl-pentene-2 etc., to form polymers having the same structure as those polymers obtained by the polymerization of α-olefins of the same number of carbon atoms, the polymerization being conducted in the presence of a catalyst comprising:
(I) An anionic coordination catalyst composed of (a) a compound of a transition metal selected from the group consisting of Groups IV–B and V–B of the Periodic Table, and (b) an activator or reducing agent which is a member of the group consisting of a metal, a metal hydride and an organometallic compound, said metal being selected from the group consisting of Groups I–A, II, III–A, and IV–A of the Periodic Table; and
(II) A compound of the metal selected from the group consisting of Groups VI and VIII of the Periodic Table.

---

This invention relates to a process for the production of normally solid polymers of aliphatic bi-secondary mono-olefins, said process being based particularly on a catalyst system containing three different substances predicated on three different metals.

It is known that certain mono-olefins can be converted into high molecular weight polymers by the utilization of catalysts containing at least two substances, one of which is a compound of a transition metal, and the other a reducing agent. These catalysts are generally described as anionic coordination catalysts, a large number of such catalysts being also known as Ziegler-type or Ziegler-Natta-type catalysts. These catalysts, however, are active only in the polymerization of olefins having a double bond in the 1-position (α-olefin or primary olefin).

Heretofore, no one has succeeded in obtaining and isolating polymers of secondary olefins having a high intrinsic viscosity, and particularly crystalline homopolymers. As a matter of fact, the Nobel prize winner Professor Natta has stated to have never formed homopolymers of internal olefins (Journal of the American Chemical Society, vol. 83 (1961), page 3343). Along this same vein, it was reported in "Chemical and Engineering News," Feb. 10, 1964, page 42, that the polymerization of butene-2 with Ziegler catalysts, such as a mixture of triethyl aluminum and titanium tetrachloride, yields only traces of polymers. Additionally, these trace polymers are liquid and exhibit a structure which is the same as the butene-2 starting material.

As for copolymers, there have already been produced, with the aid of Ziegler-type catalysts, copolymers of ethylene with butene-2; however, again these copolymers containe butene-2 in its original form.

The fact that secondary mono-olefins have not yielded worthwhile polymers amounts to a substantial waste of plentiful raw materials since secondary olefins are available in large quantities, for example, from thermal or catalytic cracking, and as by-products in synthetic processes, for example, olefin dimerization, dehydrogenation of paraffinic alkylates, and dehydration of alcohols.

A principal object of this invention, therefore, is to provide a process for the polymerization of secondary olefins.

Another object is to provide novel catalyst compositions which contribute to the success of the polymerization.

Upon further study of the specification and claims, other objects and advantages of the present invention will become apparent.

These objects are attained by the process of this invention, a description of which is further aided by the attached drawings wherein.

Figure 1:
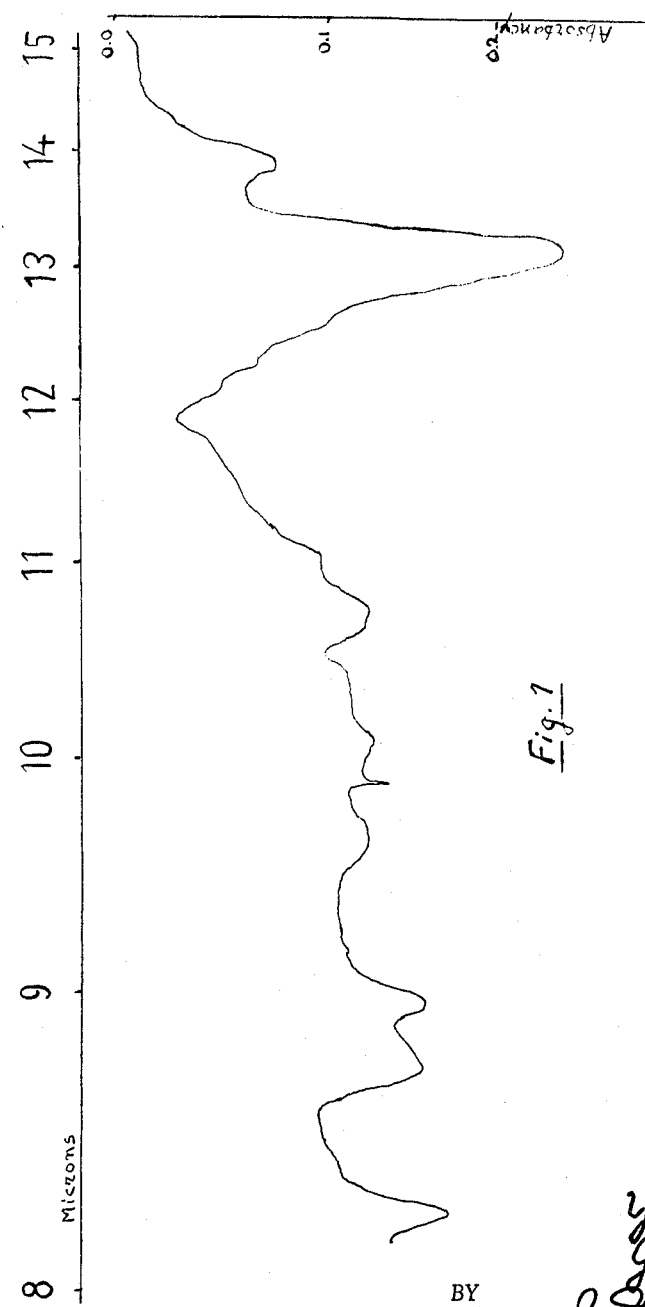
FIGURE 1 is an infrared absorption spectrum of ethylene-butene-2 copolymer as obtained in Example VIII of the specification, said spectrum showing a poly (ethylene-butene-1) structure.
Figure 2:
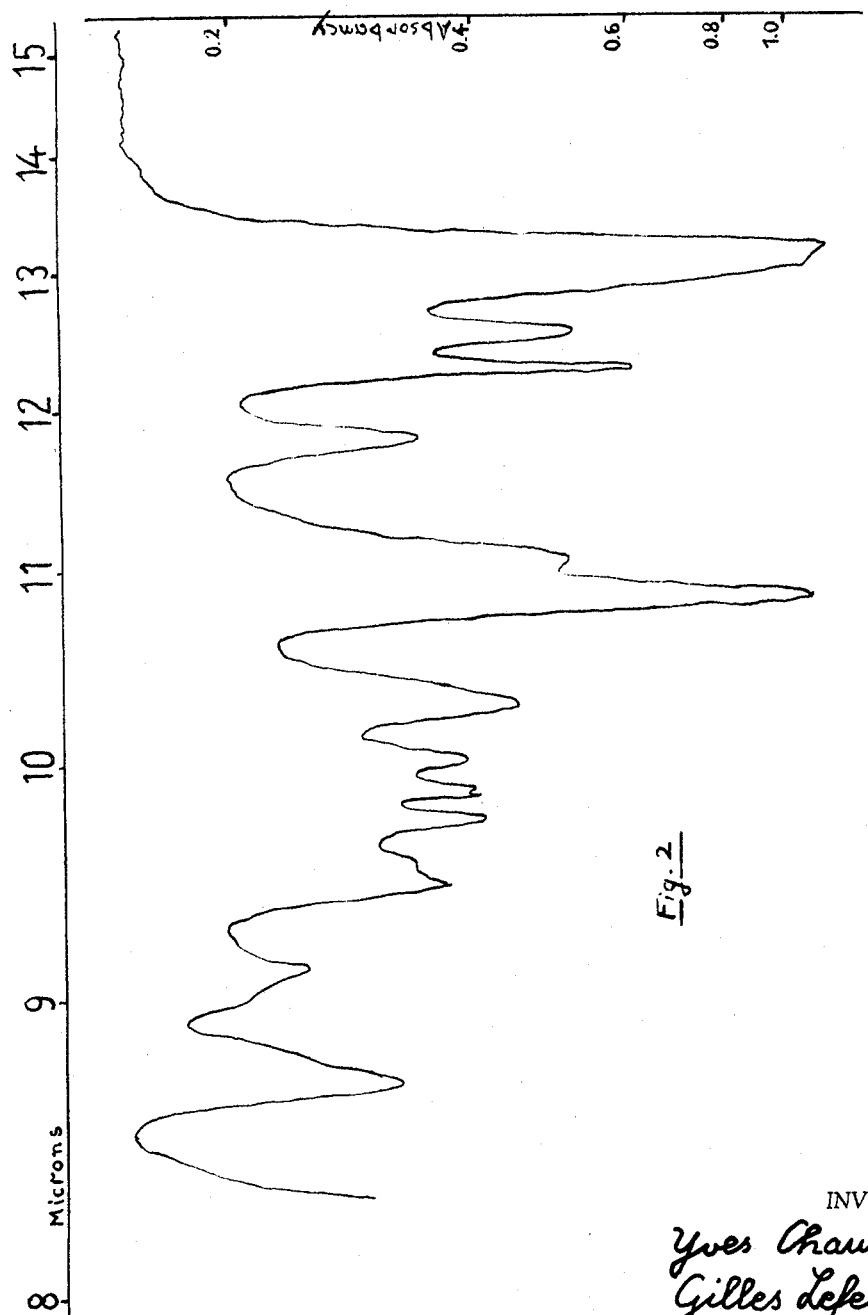
FIGURE 2, is an infrared absorption spectrum of butene-2 homopolymer is obtained in Example I, said spectrum showing a polybutene-1 structure.

Briefly, the process of this invention comprises the production of homopolymers and copolymers of aliphatic bi-secondary mono-olefins by polymerizing these mono-olefins optionally with a co-monomer in contact with a catalyst comprising:
(I) An ionic coordination catalyst composed of (a) a compound of a transition metal selected from the group consisting of Groups IV–B and V–B of the Periodic Table, and (b) an activator or reducing agent which is a member of the group consisting of a metal, a metal hydride and an organometallic compound, said metal being selected from the group consisting of Groups I–A, II, III–A, and IV–A of the Periodic Table; and
(II) A compound of a metal selected from the group consisting of Groups VI and VIII of the Periodic Table.

Contrary to the teachings of the prior art, there are thus obtained homopolymers and copolymers having a high intrinsic viscosity, e.g. higher than 2, as measured in tetrahydronaphthalene at 135° C.

In addition, the structure of the polymers and copolymers is the same as those polymers and copolymers obtained by the polymerization of alpha-olefins of the same number of carbon atoms.

Thus, starting with butene-2, there is obtained a polymer of the following structure:

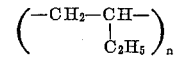

wherein $n$ is a whole number on the order of 400 to 10,000.

Likewise, by copolymerizing ethylene and butene-2, there is obtained a copolymer of the following structure:

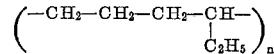

wherein $n$ is the same as above.

The preceding structures have been determined by study of the infrared spectroscopic diagram obtained by infrared spectroscopic analysis. As a result of several tests, a strong absorption has been noted in the range of 13–13.2 microns, which is characteristic of ethyl groups.

Referring now to the catalyst composition, in conjunction with the Periodic Table, it is seen that Group I–A of the Periodic Table comprises lithium, sodium, potassium, rubidium, and cesium; Group II comprises beryllium, magnesium, calcium, strontium, barium, zinc, cadmium, and mercury; Group III–A comprises boron, aluminum, gallium, indium, thallium; Group IV–B comprises titanium, zirconium, hafnium, and thorium; Group IV–A comprises silicon, germanium, tin, and lead; Group V–B comprises vanadium, niobium, and tantalum; and Group VI comprises, in particular, chromium, molybdenum, and tungsten. In Group VIII, there are found iron, nickel, cobalt, ruthenium, rhodium, palladium, osmium, iridium, and platinum.

For further description material concerning anionic coordination catalysts, reference is directed to the prior art where there are a large number of patents, periodicals, papers, and books concerning these catalysts. For example, reference is directed to "Linear and Stereoregular Addition Polymers, Polymerization with Controlled Propagation," Gaylord and Mark, Interscience Publishers, Inc., New York and London, 1959, pages 90–106.

As the reducing or activating element in such catalysts, there can be utilized all the various elements and compounds proposed in the prior art for the production of coordination catalysts employed for the stereospecific polymerization of α-olefins. These reducing or activating substances include organometallic compounds, organohalogen-metallic compounds, metal hydrides, and metals as such. Preferred specific examples are as follows:

Triethyl aluminum, triisobutyl aluminum, diethyl aluminum chloride, diethyl aluminum hydride, tridodecyl aluminum, diethyl zinc, triphenyl aluminum, triphenyl gallium, diphenyl beryllium, cyclohexyl zinc chloride, diethyl aluminum bromide, octyl aluminum diiodide, dipropyl gallium fluoride, diphenyl indium chloride, phenyl lithium, and analogs thereof;

Aluminum hydride, lithium aluminum hydride, barium hydride, potassium beryllium hydride, germanium hydride, and analogs thereof;

Sodium, magnesium, aluminum, and analogs thereof.

The particularly preferred examples are trialkyl aluminum and dialkyl aluminum halides.

As the second substance in the anionic coordination catalyst, there can be used any compound of a transition metal of Groups IV–B and V–B, as suggested in the prior art, preferably a halide or oxyhalide of titanium or vanadium, for example, titanium tetraiodide, titanium dichloride, titanium trichloride (particularly the violet form), titanium tetrachloride, vanadium tetrachloride, vanadium oxytrichloride, and/or vanadium trichloride. The particularly preferred compounds are the titanium halides.

Other compounds can be used though they are less preferable, such compounds being oxides, hydrides, acetyl acetonates, alcoholates, halogen alcoholates, and analogs thereof. Additionally, acids and acid derivatives containing an anion in which there is a transition metal of either Group IV–B or V–B are also usable. Examples of the latter are tetrabutoxy-titanium, tetra-(chloroethoxy)-titanium, tetraphenoxy-titanium, tetracyclopentoxy-titanium, tetramethoxy-zirconium, tetraethoxy-titanium, dichlorodiethoxy-titanium, and analogs thereof, titanium hydride, titanium dioxide, dicyclopentadienyl titanium dichloride, potassium fluorotitanate, vanadium dichlorodiacetate, vanadium acetylacetonate, and analogs thereof.

The third substance in the novel catalytic composition of the present invention is selected from compounds of metals of Groups VI and VIII of the Periodic Table. Compounds of metals of Group VIII are generally salts or other mineral compounds, or organic compounds similar to those compounds of metals mentioned above, but appropriate to metals of Group VIII. For example, coordination compounds can be employed. Among the various compounds, the following are preferred, though not limitative of the wide variety of compounds that can be employed: nickel dichloride, ferric chloride, cobalt dibromide, nickel diiodide, ferric fluoride, palladium dichloride, platinum tetrachloride, osmium trichloride, rhodium trichloride, nickel acetylacetonate, nickel dimethyl glyoxime, nickel carbonyl, nickel naphthenate, biscyclopentadienyl nickel, and analogs thereof. Of the latter group, the particularly preferred compounds of this invention are nickel halogenides.

Complexes of the preceding salts with organic bases can also be employed, for example, complexes of such salts with pyridine, e.g.:

$NiCl_2 \cdot 4$ pyridine or $FeCl_3 \cdot 4$ pyridine.

With respect to compounds of metals of Group VI, the chromium halogenides are preferred, for example chromium (III) chloride or bromide.

At this point, it is worthwhile to emphasize that the specifically mentioned compounds are not to be construed as the only compounds which are employable in this invention. The chemist will immediately appreciate the fact that the prior art is replete with teachings of equivalent compounds which exhibit the same function. The novel and unobvious aspect of the over-all catalytic composition of this invention is that the present catalyst contains three fundamental constituents, viz the two substances which make up the anionic coordination catalyst and a compound of either Group VI or Group VIII of the Periodic Table.

According to a particularly preferred form of this invention, the catalyst is composed of an alcoholate or other soluble compound of a metal of Groups IV–B and V–B with a mineral salt of a metal of Group VIII, the activating or reducing substance being selected in accordance with the generic description supra. As a matter of fact, if there is utilized instead of the aforesaid metal salts, a complex of a metal of Group VIII, for example, a complex with pyridine, there is obtained only a relatively small amount of polymer, which moreover exhibits only a weak stereospecificity.

Among reducing compounds described above particular attention must be paid to compounds conforming to the general formula:

wherein $R_1$, $R_2$ and $R_3$ may be the same or different monovalent radicals selected from the class consisting of hydrogen and monovalent hydrocarbon radicals preferably containing 1–24 carbon atoms. Examples of suitable R groups include an aryl radical, an aliphatic hydrocarbon radical or derivative, such as alkyl, cycloalkylalkyl, cycloalkenylalkyl, arylalkyl, cycloalkyl, alkylcycloalkyl, arylcycloalkyl, cycloalkylalkenyl, alkylaryl or cycloalkylaryl radicals. A number of examples of such groups are given in U.S. Patent 2,824,089.

However absolute preference will be given to halo-organo-metal compounds which give superior degrees of isotacticity and whose effect is particularly unobvious since, as shown hereinafter, their mixture with conventional catalysts such as $TiCl_3$ does not promote at any degree the polymerization of 2-olefins such as 2-butene, whereas a 3 component mixture of, for example, diethyl-aluminium chloride with $TiCl_3$ and nickel acetylacetonate is a good catalyst for the same polymerization.

Said preferred halo-organometal compounds may be defined by the following formula:

wherein R is a monovalent hydrocarbon radical as defined above, M is a metal of Group II, III–A or IV–A and X is a halogen atom; $m$ and $n$ are integers, the sum of which is equal to the valence of M. Preferably $m$ is 2 and $n_1$ is 1.

Examples of R have been given above (see $R_1$, $R_2$ and $R_3$ supra). Examples of M include glucinium, magnesium, zinc, cadmium, mercury, aluminium, gallium, indium and thallium. Examples of halogen are fluorine, chlorine, bromine and iodine.

Amongst said compounds, we prefer most of all compounds of the last formula wherein R is a hydrocarbon radical, preferably an alkyl radical, M is aluminum, X is chlorine, or iodine, m is 2 and n is 1.

When, in the last formula, m is 1 and n is 2, it is essential to add a Lewis base as defined hereinafter to the 3 component catalytic mixture of this invention.

As specific examples of catalytic compositions of this invention, the following may be mentioned:

titanium trichloride, nickel dichloride and diethylaluminium chloride titanium tetrachloride, ferric bromide, and diphenylaluminium bromide, vanadium oxytrichloride, chromic chloride and diisopropylgallium chloride zirconium trichloride, palladium dichloride and triethylgermanium chloride titanium dibromide, cobaltous chloride and triethyltin chloride titanium tetrabutoxide, nickel dichloride and diethylaluminium iodide titanium tetrachloride, nickel dimethylglyoxime and diethylaluminium chloride vanadium dichlorodiacetate, osmium trichloride, ethylaluminium sesquichloride and triethylamine vanadium acetylacetonate, nickel dichloride and cyclohexylzinc chloride titanium tetrachloride, nickel naphthenate and dicyclohexylaluminium fluoride titanium trichloride, bis cyclopentadienyl nickel and diethylaluminium chloride titanium trichloride, nickel acetylacetonate, ethylaluminium dichloride and tetrahydrofuran titanium trichloride, nickel acetylacetonate, ethylaluminium dichloride and hexamethylphosphoramide.

The monomers which can be employed in this invention are aliphatic bi-secondary mono-olefins of the formula

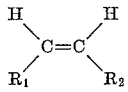

wherein $R_1$ represents an alkyl group of 1–12 carbon atoms, being straight-chain or branched, and $R_2$ is a straight chain alkyl group of 1–4 carbon atoms. $R_1$ can also be substituted by 1–3 halogen atoms, or 1–3 aryl and/or cycloalkyl radicals wherein said aryl radicals contain 6 to 10 carbon atoms, and said cycloalkyl radicals 5 to 10 carbon atoms, and are preferably cyclohexyl or phenyl. When $R_1$ is substituted by aryl and/or cycloalkyl groups, it may be a hydrocarbon aralkyl of 7–24 carbon atoms, a hydrocarbon cycloalkylalkyl of 6–24 carbon atoms or a hydrocarbon cycloalkyl-aryl-alkyl of 12–24 carbon atoms. $R_2$ may be methyl, ethyl, n.propyl or n.butyl. Additionally, there can also be employed in this invention mixtures of the bi-secondary olefins with themselves or with ethylene.

Examples of the bi-secondary mono-olefins are β-monoethylenically unsaturated hydrocarbons of 4–24 carbon atoms, for example 2-butene, 2-pentene, 4-methyl-2-pentene, 2-hexene, 4-methyl-2-hexene, 5-methyl-2-hexene, 2-heptene, 6-methyl-2-heptene, 4,4-dimethyl-2-pentene, 4,4-dimethyl-2-hexene, and 4-methyl, 4-phenyl-2-pentene, 3-hexene, 3-heptene, 1,1,1-triphenyl-2-pentene and 1-phenyl-1-cyclohexyl-2-hexene and 1-cyclohexyl-2-pentene.

Preferred examples are 2-butene, 2-pentene and 4-methyl-2-pentene.

The polymerization can, if desired, be conducted in the presence of solvents, such as, for example, paraffinic or aromatic hydrocarbons or halogenated derivatives thereof, particularly chloro-compounds. The manner in which the solvents are employed is along the lines of the methods suggested in the prior art for polymerization reactions in the presence of anionic coordination catalysts. The temperature of the polymerization reaction is generally in the range of −20° C. to +150° C., preferably between +15° C. and +80° C. The reaction pressure can be varied widely, it being sufficient to maintain a liquid phase.

With respect to the relative proportions of the various substances of the novel catalysts of this invention, the ratio of the transition metal substance to the reducing or activating substance is the same as in conventional anionic coordination catalysts, i.e., in the range of about 0.01 to 100, preferably 0.1 to 10 mols of transition metal substance to 1 mol of the activating substance. As for the proportion of the compound of a metal from Groups VI or VIII of the Periodic Table, it can be varied widely, for example between 0.001 to 100 atoms of this metal to 1 atom of a metal of Groups IV–B and V–B of the coordination catalyst. Above and below these limits, the catalyst nevertheless functions, but not with as beneficial results. Preferably, the proportion of the metallic compound of Group VI or VIII is equivalent to about 0.1 to 10 atoms of said metal to 1 atom of Group IV–B or V–B metal. The catalytic composition can be introduced in its entirety at the beginning of the reaction, or it can be added piecemeal during the course of the reaction.

As is the case with polymerizations based on Ziegler-type catalysts, it is also important to operate in the substantial absence of oxygen and water vapor.

As another aspect of this invention, it has been surprisingly discovered that it is possible to significantly improve the results obtained by the above-described general procedure. For example, the properties of the resultant polymer can be altered by either a substantial increase in the relative percentage of isotactic polymer, or by the reduction or suppression of oligomers, without any deleterious reduction in the conversion rate to the solid polymer. These markedly improved results are obtained by still another addition to the novel catalyst composition of this invention. This other addition is a compound which can be classified as a Lewis base.

This added compound is preferably a tertiary amine, a heterocyclic nitrogen base, or a quaternary amonium salt, for example, triethylamine, pyridine, triethylenediamine, N-methylpiperidine, or benzyl trimethyl ammonium chloride. Aside from the latter preferred compounds, it is also possible to gain substantial beneficial results by the utilization of the addition of mercaptans, for example p-tolylmercaptan, phosphoramides, particularly hexamethyl phosphoramide, phosphines, for example triphenyl phosphine, arsines, for example triethyl arsine, stibines, for example trimethyl stibine, or ethers, for example anisole or phenetole.

Still other compounds are employable, such as phosphorous and phosphoric esters, phosphorous and phosphoric ester-amides, carboxylic esters or amides, carboxylic ester-amides, and analogs thereof, specific examples being triethyl phosphate, triphenyl phosphite, dimethyl acetamide, adipamide, tributyl phosphate, tricresyl phosphate, and analogs thereof. The employment of these Lewis bases in conjunction with anionic coordination catalysts is widely described in published patents.

Of the various Lewis bases that can be employed, it is preferred in this invention to use either a tertiary amine or a phosphine. It is to be understood, however, that the generic aspects of this invention are not limited to any of the specific compounds mentioned above, but are directed to the employment of a Lewis base, broadly.

The proportion in which the Lewis base additive is used is on the order of 0.5–5 mols per mol of the compound of Groups IV–B and V–B of the catalyst.

Another particularly interesting aspect of this invention is the utilization of the novel catalyst compositions for the production of copolymers. As stated above, it is possible to copolymerize a bi-secondary mono-olefin with an α-olefin, ethylene being particularly interesting because of the resultant properties of the synthesized copolymers. As a matter of fact, the properties of the copolymers can be varied at will by varying the proportions of the monomers employed in the polymerization reaction.

Thus, a new and surprising result of this invention is that it is possible to achieve such a wide range of copolymer properties by merely varying the ratio of the monomers. Ordinarily, in the art of copolymerization, it is not possible to achieve wide ranges of copolymer compositions, irrespective of the ratio of the monomers employed. In this invention, however, by for example varying the ratio of monomers for the production of a copolymer of ethylene and butene-2, it is possible to produce copolymers which consume 1–99 mols of ethylene per 99–1 mol of the bi-secondary olefin. Consequently, it is seen that when the copolymers contain a high content of ethylene, they will be quite crystalline, whereas when the copolymers contain a high content of the internal olefin (bi-secondary) the copolymers will exhibit elastomeric properties. Obviously, between these two extremes, a great range of intermediate properties can be obtained.

Thus, it is shown that the copolymers obtained according to this invention are of a completely different nature than those copolymers of the prior art wherein ethylene and internal olefin were polymerized in the presence of an anionic coordinatiton catalyst, such as, for example, vanadium tetrachloride (or vanadium acetylacetonate) +trialkyl aluminum or dialkyl aluminum halide. In the latter case, the prior art copolymers exhibit a structure wherein the internal olefin structure is maintained, and where the molar ratio of the internal olefin to ethylene is always equal or lower than 1. In contrast, according to the present invention, at least a portion of the internal olefin is converted to an $\alpha$-olefinic form in the copolymer, and the molar ratio of the internal olefin consumed to the ethylene consumed can exceed 1.

The polymers obtained according to this invention can be substituted for $\alpha$-olefinic polymers for practically all uses. The polymers of this invention generally exhibit a high degree of crystallinity and a high melting point.

Without further elaboration, it is believed that one skilled in the art can, using the preceding description, utilize the present invention to its fullest extent. The following preferred specific embodiments are, therefor, to be construd as merely illustrative, and not limitative of the remainder of the specification and claims in any way whatsoever. Additionally, it is to be noted that these examples of the processes of this invention are conducted in the substantial absence of oxygen and humidity.

EXAMPLE I

Into a container maintained under a pressure of dry nitrogen, there is introduced a mixture having the following composition:

0.02 g. $NiCl_2$ in the form of a 2% by weight $NiCl_2 \cdot$ (pyridine)$_2$ complex suspension in benzene;
6 g. butene-2;
0.5 cc. triethyl aluminum;
0.14 g. $\alpha$-titanium-trichloride.

The reaction mass is agitated at 15° C. for 60 hours; then it is added to 50 cc. ethanol containing 10% by weight of hydrochloric acid. A solid polymer (1.8 g.) precipitates, of which 0.9 g. is insoluble in boiling ether. The melting point of the insoluble fraction is 125° C., and it exhibits an intrinsic viscosity, as measured in tetrahydronaphthalene at 135° C., of 2.27. By infrared spectrographic analysis of the insoluble polymer, there is indicated a structure which is essentially the same as polybutene-1, viz a strong absorption between 13 and 13.2 microns.

EXAMPLE II

A mixture having the following composition is introduced into a reactor, under a nitrogen atmosphere:

26 g. pentene-2 (28% cis and 72% trans);
1.2 cc. triethyl aluminum;
200 mg. $NiCl_2$ in the form of a 2% by weight $NiCl_2 \cdot$ (pyridine)$_2$ complex suspended in benzene;
1.48 g. $TiCl_3$ (violet form).

The reaction mixture is agitated at 25° C. for 64 hours. As in Example I, there are obtained by precipitation 5.86 g. of solid polypentene-1, 90% of which is insoluble in boiling acetone. The insoluble fraction exhibits an intrinsic viscosity of 2.35 (as measured in tetrahydronaphthalene at 135° C.). A strong absorption is noted which, as in the following examples, has a value of between 13 and 13.2 microns.

EXAMPLE III

A mixture having the following composition is introduced into a reaction vessel, under an argon atmosphere:

65 g. butene-2 (5% cis and 95% trans);
3 cc. triethyl aluminum;
3.7 g. titanium trichloride (violet form);
490 mg. $FeCl_2$ in the form of a $FeCl_2 \cdot$ (pyridine)$_2$ complex.

The reaction mixture is agitated at 25° C. for 60 hours. The polymer precipitates as set forth in Example I. There are obtained 4 g. of solid polybutene-1, 2 g. of which are insoluble in boiling ether. The insoluble fraction has a softening point of about 120° C. and an intrinsic viscosity of 2.20, as measured in tetrahydronaphthalene at 135° C.

EXAMPLE IV

A mixture having the following composition is introduced into a reactor, under a nitrogen atmosphere:

65 g. pentene-2 (28% cis and 72% trans);
3 cc. triethyl aluminum;
3.7 g. titanium trichloride (violet form);
520 mg. $FeCl_2 \cdot$ (pyridine)$_2$.

The mixture is agitated at 30° C. for 60 hours. The polymer precipitates as in Example I. There are obtained 5 g. polypentene-1, of which 95% is insoluble in boiling acetone. The intrinsic viscosity of the insoluble fraction is 2.15 (as measured in Tetralin at 135° C.).

EXAMPLE V

A mixture having the following composition is introduced into a reactor, under a nitrogen atmosphere:

0.364 g. of crystallized $NiCl_2$;
16 g. butene-2;
0.25 g. triethyl aluminum;
0.12 g. tetraisopropyl titanium.

The reaction mixture is agitated at 40° C. for 24 hours, and precipitation takes place as in Example I. There are obtained 3.9 g. polybutene-1, of which 46% is insoluble in boiling ethylether and melts at 125° C. The insoluble fraction has an intrinsic viscosity of 2.6 (as measured dissolved in tetrahydronaphthalene at 135° C.).

EXAMPLE VI 240 cc. of butene-2 are treated at 40° C. for 24 hours with a catalyst of 3.7 g. $TiCl_3$ (prepared by the reaction of titanium tetrachloride with diethyl aluminum chloride, heated to a temperature higher than 150° C.), 2.45 cc. diethyl aluminum chloride and 0.87 g. nickel acetylacetonate. Variable quantities of triethylamine are added.

The polymer is separated as in Example I, and the results are tabulated as follows:

| Mol Ratio Triethylamine/TiCl₃: | Conversion to Solid Polymer, percent | Conversion to Oligomer, percent | Isotacticity, percent |
|---|---|---|---|
| 0 | 6.7 | 54 | 36 |
| 1/8 | 9.5 | 37 | 41 |
| 1/4 | 8.2 | None | 86 |
| 1/2 | 8.5 | None | 72 |

The isotacticity is expressed by the measured percentage of polymer insoluble in boiling ether.

EXAMPLE VII 240 cc. of butene-2 are polymerized for 24 hours at 40° C. in the presence of a catalyst composed of 0.9 g. titanium trichloride identical to that of Example VI, 2.45 cc. of diethyl aluminum chloride, and 0.87 g. nickel acetylacetonate, with variable quantities of tetramethyl ammonium iodide. The results are listed in the following table:

| Mol Ratio Triethylamine/TiCl₃: | Conversion to Solid Polymer, percent | Conversion to Oligomer, percent | Isotacticity, percent |
|---|---|---|---|
| 0 | 5.7 | 22 | 80 |
| 1/4 | 4.6 | 15 | 78.5 |
| 1/2 | 3.5 | 8.5 | 83 |
| 1 | 3.2 | None | 78.5 |

It is noted that by accepting a reduction in the conversion rate to the solid polymer, it is possible to avoid the formation of oligomers completely.

EXAMPLE VIII

Into a 100 cc. flask previously dried and maintained under an atmosphere of argon, there are introduced under agitation 30 cc. of anhydrous hexane, 6 cc. of a suspension of anhydrous nickel chloride in hexene (corresponding to 1 g. NiCl₂), 2 cc. diethyl aluminum chloride and 0.8 cc. tetra-n-butyl titanium. The resulting catalytic mixture is then agitated for a period of 21 hours at 20° C.

Into a 250 cc. stainless steel reactor provided with a water jacket, a manometer, and an agitation system and which was previously dried under vacuum, there are introduced 100 cc. butene-2 in liquid form and 15 cc. of the catalytic mixture prepared in the previous paragraph. The temperature of the reaction mass is raised to 50° C., and then a partial pressure of ethylene of 0.15 kg./cm.² is maintained in the reactor. During 4 hours, there are thus absorbed 4.4 g. ethylene. The catalyst is then destroyed by a mixture of water-ethanol-hydrochloric acid, and the excess butene-2 is evaporated. There are thus obtained 8.5 g. of a rubbery copolymer consisting of 68 mol percent ethylene and 32 mol percent butene, and which is completely soluble in boiling heptene. 66% of the copolymer is extractable with boiling ether. Upon infrared spectrographic analysis, there is seen an absorption between 13 and 13.2 microns, indicating a copolymer structure of ethylene-butene-1.

EXAMPLE IX

For 48 hours at 40° C., a mixture is agitated, said mixture having the following composition:

13.5 g. butene-2;
0.4 g. PdCl₂;
1.6 cc. triethyl aluminum;
0.9 g. TiCl₃.

After precipitation by ethanol containing 10% by weight of hydrochloric acid, there are obtained 3 g. of a solid crystalline polybutene-1. The intrinsic viscosity, as measured at 135° C. in tetrahydronaphthalene, is 2.35.

EXAMPLE X

There is agitated at 70° C., for 48 hours, a mixture composed of:

13.5 g. butene-2;
0.153 g. PtCl₂;
0.78 cc. triethyl aluminum;
0.43 g. TiCl₃.

As in the preceding example, there is obtained a polybutene-1 solid.

EXAMPLE XI

There is agitated at 20. C., for three days, a mixture composed of:

0.02 g. of NiCl₂ in the form of its pyridine complex, the complex being suspended in benzene;
6.5 g. butene-2;
0.3 cc. triethyl aluminium;
0.1 g. VCl₃.

Again, as in the preceding two examples, a solid is obtained which is polybutene-1.

The same result is obtained when triethyl aluminum is replaced by the same volume of chlorodiethylaluminium.

EXAMPLE XII

There is agitated, at 35° C. for 60 hours, a mixture composed of:

0.335 g. anhydrous CrCl₃;
5.4 g. butene-2;
0.14 g. alpha-titanium trichloride (violet form);
0.6 cc. triethyl aluminium.

There is obtained, after operating as in Example I, polybutene-1 (1.1 g., of which 0.5 g. is insoluble in boiling ether).

The insoluble fraction has a melting point of 120° C. Its intrinsic viscosity is 2.45, as measured in tetrahydronaphthalene at 135° C., and it exhibits a strong absorption between 13 and 13.2 microns.

EXAMPLE XIII

There is agitated for 15 hours at 57° C. a mixture composed of:

0.364 g. CrCl₃;
0.14 g. α-titanium trichloride;
7.4 g. 4-methyl-2-pentene;
0.5 cc. triethyl aluminum.

There is obtained, after precipitation by ethanolic HCl 0.74 g. of poly-(4-methyl-1-pentene), of which 60% is insoluble in boiling ether.

EXAMPLE XIV

Operating as in Example VI, but replacing triethylamine by triphenylphosphine (the titanium trichloride having been obtained by reacting aluminum with titanium tetrachloride), the following results are obtained:

| | Conversion to Solid Polymer, percent | Conversion to Oligomer, percent | Isotacticity, percent |
|---|---|---|---|
| Mol Ratio Triphenylphosphine/TiCl$_3$: | | | |
| 0 | 4.8 | 23.5 | 71.9 |
| 1/2 | 6.7 | 31 | 85 |
| 1 | 5.2 | 8.6 | 86 |
| 2 | 4.1 | 0 | 81 |

EXAMPLE XV

There is admixed, in the following order:

0.545 mole of 2-butene;
1.24 millimol of TiCl$_3$ (resulting from reducing TiCl$_4$ by means of ethylaluminium sesquichloride);
2 cm.$^3$ of hexane;
3.9 millimol of Al (C$_2$H$_5$)$_2$ Cl;
Varying amounts of nickel acetylacetonate.

The mixture is heated up to 40° C. and stirred at this temperature for 24 hours.

The following conversions of 2-butene to solid poly-1-butene (100× weight of solid polymer/weight of starting 2-butene) were obtained:

| | Conversion, percent | Isotacticity, percent |
|---|---|---|
| Ni acetylacetonate, mg.: | | |
| 0 | 0 | |
| 3.48 | 7.9 | 84.5 |
| 17.4 | 8.5 | 88 |
| 34.8 | 9.3 | 87 |
| 69.4 | 8.7 | 80 |

EXAMPLE XVI

Example IV is repeated, except that triethyl aluminum is replaced by the same volume of chlorodiethyl aluminum.

There is obtained 9 g. polypentene-1.

EXAMPLE XVII

Example XIII is repeated, except that triethyl aluminium is replaced by the same volume of chlorodiethyl aluminium.

There is obtained 2 g. of poly-(4-methyl-1-pentene).

The preceding examples can be repeated with similar success, but replacing the specifically mentioned catalytic compositions in whole or in part by equivalents thereof— as taught generically and specifically in the description of the invention. Furthermore, homo- and copolymers of other bi-secondary olefins can be produced by merely replacing the monomers of the examples with the desired monomers.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalents of the following claims.

What is claimed is:

1. A process for the production of normally solid polymers, said process comprising polymerizing a hydrocarbon bi-secondary olefin of the formula:

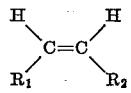

wherein R$_1$ represents a member of the group consisting of unsubstituted alkyl of 1–12 carbon atoms, hydrocarbon aralkyl of 7–24 carbon atoms, hydrocarbon cycloalkylalkyl of 6–24 carbon atoms and hydrocarbon cycloalkyl-aryl-alkyl of 12–24 carbon atoms and R$_2$ is a straight chain alkyl group of 1–4 carbon atoms, said polymerizing being conducted in contact with a catalyst comprising:
  (I) an anionic coordination catalyst being composed of (a) a compound of a transition metal selected from the group consisting of Group IV–B and Group V–B metals of the Periodic Table, and (b) a member of the group consisting of a metal, a metal hydride and an organometallic compound, said metal being selected from the group consisting of Groups I–A, II, III–A, and IV–A metals of the Periodic Table; and
  (II) a compound of a metal selected from the group consisting of Groups VI and VIII metals of the Periodic Table, the resultant polymerizate comprising polymers having the same structure as those polymers obtained by the polymerization of α-olefins of the same number of carbon atoms.

2. A process as defined in claim 1, wherein member I(b) is a trialkyl aluminum, the alkyl portions of which contain 1–24 carbon atoms.

3. A process as defined in claim 1, wherein member I(b) is a dialkyl aluminium halide, the alkyl portions of which contain 1–24 carbon atoms.

4. A process as defined in claim 1, wherein member I(b) is triethyl aluminium.

5. A process as defined in claim 1, wherein the transition metal compound I(a) is a titanium halogenide.

6. A process as defined in claim 1, wherein the transition metal compound I(a) is a vanadium halogenide.

7. A process as defined in claim 1, wherein compound II is a nickel halogenide.

8. A process as defined in claim 1, wherein the atomic ratio of compound II to the anionic coordination catalyst is 0.001–100 atoms of the metal of compound II to 1 atom of metal of member I(a).

9. A process as defined in claim 1, wherein the polymerization step is conducted in the further presence of a Lewis base.

10. A process as defined in claim 1, wherein the polymerization is conducted in the further presence of a tertiary amine.

11. A process as defined in claim 1, wherein the polymerization is conducted in the presence of a phosphine.

12. A process as defined in claim 1, wherein ethylene is added to the bi-secondary olefin, to form a copolymer thereof.

13. A process for the production of normally solid polybutene-1, said process comprising polymerizing butene-2 in contact with a catalyst comprising triethyl aluminum, α-titanium trichloride, and nickel dichloride.

14. A process as defined in claim 13, further comprising conducting the polymerization in the presence of a Lewis base.

15. A process as defined in claim 14, wherein said Lewis base is a tertiary amine.

16. A process for the production of normally solid polymers, said process comprising contacting a member of the group consisting of 2-butene, 2-pentene and 4-methyl-2-pentene with a catalyst comprising:
  (a) a transition metal compound, the metal of which is selected from the group consisting of Group IV–B and Group V–B metals;
  (b) a compound of a metal selected from the group (c) a halo-organometallic compound of the formula consisting of Group VI and Group VIII metals; and $$R_2MX$$

wherein R is a monovalent hydrocarbon radical, M is a metal selected from Groups II, III–A and IV–A and X is a halogen atom, the resultant polymerizate comprising polymers having the same structure as those polymers obtained by the polymerization of α-olefins of the same number of carbon atoms.

17. A process as defined by claim 1 wherein said catalytic composition consists essentially of titanium trichloride, nickel dichloride and diethyl aluminum chloride.

18. A process as defined by claim 1 wherein said catalytic composition consists essentially of titanium tetrachloride, ferric bromide, and diphenyl aluminum bromide.

19. A process as defined by claim 1 wherein said catalytic composition consists essentially of vanadium oxytrichloride, chromic chloride and diisopropylgallium chloride.

20. A process as defined by claim 1 wherein said catalytic composition consists essentially of zirconium trichloride, palladium dichloride and triethylgermanium chloride.

21. A process as defined by claim 1 wherein said catalytic composition consists essentially of titanium dibromide, cobaltous chloride and triethyltin chloride.

22. A process as defined by claim 1 wherein said catalytic composition consists essentially of titanium tetrabutoxide, nickel dichloride and diethyl aluminum iodide.

23. A process as defined by claim 1 wherein said catalytic composition consists essentially of titanium tetrachloride, nickel dimethylglyoxime and diethyl aluminum chloride.

24. A process as defined by claim 1 wherein said catalytic composition consists essentially of vanadium dichlorodiacetate, osmium trichloride, ethyl aluminum sesquichloride and triethylamine.

25. A process as defined by claim 1 wherein said catalytic composition consists essentially of vanadium acetylacetonate, nickel dichloride and cyclohexylzinc chloride.

26. A proess as defined by claim 1 wherein said catalytic composition consists essentially of titanium tetrachloride, nickel naphthenate and dicyclohexyl aluminum fluoride.

27. A process as defined by claim 1 wherein said catalytic composition consists essentially of titanium trichloride, bis-cyclopentadienyl nickel and diethyl aluminum chloride.

28. A process as defined by claim 1 wherein said catalytic composition consists essentially of titanium trichoride, nickel acetylacetonate, ethyl aluminum dichloride and tetrahydrofuran.

29. A process as defined by claim 1 where said catalytic composition consists essentially of titanium trichloride, nickel acetylacetonate, ethyl aluminum dichloride and hexamethylphosphoramide.

30. A process as defined by claim 1 wherein said bisecondary olefin is 4-methyl-2-pentene.

31. A process as defined by claim 1 wherein said bisecondary olefin is 2-butene.

32. A process as defined by claim 1 wherein said transition metal is titanium.

33. A process as defined by claim 1 wherein said transition metal is titanium; said metal selected from the group consisting of Groups I–A, II, III–A, and IV–A is aluminum; and said metal selected from the group consisting of Groups VI and VIII is nickel.

34. A process as defined by claim 1 wherein said metal selected from the group consisting of Groups VI and VIII is selected from the group consisting of chromium, molybdenum, tungsten, iron, nickel, cobalt, ruthenium, palladium, osmium, iridium and platinum.

35. A process as defined by claim 16 wherein said metal selected from the group consisting of Groups VI and VIII is selected from the group consisting of chromium, molybdenum, tungsten, iron, nickel, cobalt, ruthenium, rhodium, palladium, osmium, iridium and platinum.

36. A process as defined by claim 34 wherein said metal is nickel.

37. A process as defined by claim 35 wherein said metal is nickel.

38. A process for the polymerization of butene-2 being characterized by obtaining polybutene-1 from butene-2, said process comprising contact butene-2 in the presence of an organic solvent with a catalyst comprising:
(a) Group V–B metal halides;
(b) a compound of a Group VIII acetyl-acetonate; and
(c) an alkylaluminum compound represented by a general formula of $AlR_{(3-n)}X_n$ wherein R is an alkyl radical, X is an atom selected from a group consisting of a hydrogen atom and a halogen atom and $n$ is an integer of from 0 to 2, respectively.

References Cited

UNITED STATES PATENTS 2,956,989  10/1960  Iezl _____ 260—88.2

OTHER REFERENCES

Yuguchi, Polymers Letters, vol. 2, pp. 1035–1039, July 1964.

JOSEPH L. SCHOFER, Primary Examiner

S. M. LEVIN, Assistant Examiner

U.S. Cl. X.R.

260—93.7

UNITED STATES PATENT OFFICE
CERTIFICATE OF CORRECTION

Patent No. 3,479,329 November 18, 1969

Yves Chauvin et al.

It is certified that error appears in the above identified patent and that said Letters Patent are hereby corrected as shown below:

Column 13, line 1 should be line 2, and line 2 should be line 1 --. Column 14, line 17, after "ruthenium" insert -- rhodium --.

Signed and sealed this 13th day of October 1970.

(SEAL)
Attest:

Edward M. Fletcher, Jr.　　　　　　　　　WILLIAM E. SCHUYLER, JR.
Attesting Officer　　　　　　　　　　　　　Commissioner of Patents